(12) United States Patent
Buck et al.

(10) Patent No.: US 8,389,050 B2
(45) Date of Patent: Mar. 5, 2013

(54) METHOD OF COATING TUBES USING A SELF-ASSEMBLY PROCESS

(75) Inventors: Thomas LaVee Buck, Corning, NY (US); Jia Liu, Painted Post, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1139 days.

(21) Appl. No.: 12/275,712

(22) Filed: Nov. 21, 2008

(65) Prior Publication Data

US 2010/0129545 A1    May 27, 2010

(51) Int. Cl.
*B05D 7/22*   (2006.01)
(52) U.S. Cl. ............ 427/181; 427/230; 427/430.1; 977/778; 977/810; 977/811; 977/882; 977/883
(58) Field of Classification Search ............ 427/230, 427/235, 430.1, 181, 180; 977/778, 810, 977/811, 882, 883
See application file for complete search history.

(56) References Cited

U.S. PATENT DOCUMENTS

| | | | |
|---|---|---|---|
| 5,089,299 A * | 2/1992 | Van 'T Veen et al. | 427/245 |
| 7,022,303 B2 | 4/2006 | Riman et al. | |
| 2005/0095422 A1 * | 5/2005 | Sager et al. | 428/336 |
| 2005/0188916 A1 | 9/2005 | Riman et al. | |
| 2005/0255236 A1 | 11/2005 | Deng et al. | |

FOREIGN PATENT DOCUMENTS

| | | |
|---|---|---|
| EP | 0212762 | 3/1987 |
| WO | 2005/015792 A2 | 2/2005 |
| WO | WO 2010/059682 A1 * | 5/2010 |

OTHER PUBLICATIONS

International Preliminary Report on Patentability for PCT/US2009/064928, May 24, 2011, 5 pages.*
Asher et al., "Mesoscopically Periodic Photonic-Crystal Materials for Linear and Nonlinear Optics and Chemical Sensing", MRS Bulletin, 1998, 23, (10), 44-50.
Blaaderen, "From the de Broglie to Visible Wavelengths: Manipulating Electrons and Photons With Colloids", MRS Bulletin, 1998, 23, (10), 39-43.
Colvin, "From Opals to Optics: Colloidal Photonic Crystals", MRS Bulletin, 2001, 26, (8), 637-641.
Gates et al., "Fabrication and characterization of photonic crystals with well-controlled thickness and stop-band attenuation", Applied Physics A: Materials Science and Processing 2003, 76, (4), 509-513.
Painter et al., "Two-Dimensional Photonic Band-Gap Defect Mode Laser", Science 1999, 284, 1819-1821.

(Continued)

*Primary Examiner* — William Phillip Fletcher, III
(74) *Attorney, Agent, or Firm* — Michael W. Russell

(57) ABSTRACT

A method of coating an inner surface of a tubular workpiece includes immersing the tubular workpiece lengthwise into a liquid subphase, inserting a first end of a delivery tube into the tubular workpiece so as to bring a distal end surface of the delivery tube to within a predetermined distance from the liquid surface, dispensing a suspension of coating particles into the first delivery tube to form a monolayer of the coating particles on the liquid surface in an area of the liquid surface between the inner surface of the tubular workpiece and an outer surface of the first delivery tube, and withdrawing at least a portion of the tubular workpiece from the liquid subphase so as to form a coating of the coating particles on a portion of the inner surface of the workpiece.

25 Claims, 3 Drawing Sheets

OTHER PUBLICATIONS

Wang et al., "Formation of thin transparent conductive composite films from aqueous colloidal dispersions", Macromolecules 1999, 32, (19), 6172-6179.

Matsushita et al., "Light propagation in composite two-dimensional arrays of polystyrene spherical particles", Langmuir 2000, 16, (2), 636-642.

Bravo et al., "Transparent superhydrophobic films based on silica nanoparticles", Langmuir 2007, 23, (13), 7293-7298.

Cebeci et al., "Nanoporosity-Driven Superhydrophilicity: A Means to Create Multifunctional Antifogging Coatings", Langmuir 2006, 22, 2856-2862.

Wei, "Designing Plasmonic Nanomaterials as Sensors of Biochemical Transport", J. Surf. Sci. Nanotech. 2006, 4, 9-18.

Rizza et al., "Self-Assembly of Monolayers of Semiconductor Nanocrystallites", Chem. Mater. 1997, 9, 2969-82.

Giersig et al., "Formation of ordered two-dimensional gold colloid lattices by electrophoretic deposition", Journal of Physical Chemistry 1993, 97, (24), 6334-6336.

Bigioni et al., "Kinetically driven self assembly of highly ordered nanoparticle monolayers", Nature Materials 2006, 5, 265.

Yang et al., "Opal Circuits of Light—Planarized Microphotonic Crystal Chips", Advanced Functional Materials 2002, 12, (6-7), 425-431.

Prevo et al., "Controlled, Rapid Deposition of Structured Coatings from Micro- and Nanoparticle Suspensions", Langmuir 2004, 20, 2099-2107.

Burmeister et al., "From mesoscopic to nanoscopic surface structures: Lithography with colloid monolayers", Advanced Materials 1998, 10, (6), 495-497.

Hulteen et al., "Nanosphere lithography: A materials general fabrication process for periodic particle array surfaces", Journal of Vacuum Science & Technology A 1995, 13, 1553-1558.

Wang et al., "Fabrication of Two- and Three-Dimensional Silica Nanocolloidal Particle Arrays", Journal of Physical Chemistry B 2003, 107, 3400-4.

Gates et al., "Assembly of Nanoparticles into Opaline Structures over Large Areas", Adv. Mater. 1999, 11, 466.

Liu et al., "Guided self-assembly of Au nanocluster arrays electronically coupled to semiconductor device layers", Applied Physics Letters 2000, 77, (3), 373-375.

Lin et al., "Nanoparticle Assembly and Transport at Liquid-Liquid Interfaces", Science 2003, 299, 226.

Liu et al., "Single-Crystal-like Materials by the Self-Assembly of Cube-Shaped Lead Zirconate Titanate (PZT) Microcrystals", Langmuir 2005, 21, 3207-3212.

Shishido et al., "Preparation of ordered mono-particulate film from colloidal solutions on the surface of water and continuous transcription of film to substrate", Colloids and Surfaces A: Physicochemical and Engineering Aspects, vol. 311, Issues 1-3, Dec. 1, 2007, pp. 32-41.

Machine Translation of EP0212762.

European Patent Application No. 09828140.5 Search Report.

* cited by examiner

US 8,389,050 B2

METHOD OF COATING TUBES USING A SELF-ASSEMBLY PROCESS

BACKGROUND AND SUMMARY

The present invention relates generally to a method of coating tubular structures using a self-assembly process, and more specifically to a method of forming thin film coatings on inner surfaces of tubular structures.

Thin film coatings comprising micro- and/or nanoscale particles are of technological interest. Such coatings can impart coated substrates new attributes and functionalities, including chemical, optical and electronic properties as well as surface texture. Example applications of such coated substrates include photonic crystals, small lasers formed in 2-D assembly of colloidal particles, films for tailoring surface conductivity on composite substrates for sensor applications, waveguides, coatings for modification of rheological properties, surface-enhanced Raman scattering (SERS) substrates, etc.

A variety of different methods for assembling micro- and/or nanoscale particles into thin film coatings on solid substrates are known. For example, thin film coatings can be formed by adsorption onto a substrate from a solution driven by chemical affinity, by electrostatic attraction (e.g., layer-by-layer or LBL deposition), or by an electrical field (electrophoretic deposition), evaporation-induced self-assembly, convective assembly, dip coating, spin coating, gravitational sedimentation, self-assembly under confinement, assembly at an air-liquid interface using, for example, a Langmuir-Blodgett technique, assembly at a liquid-liquid interface, etc. However, most of these methods are limited in practical applications by small sample sizes, slow coating rates, difficulty in controlling coating thickness, and/or the need for complex equipment.

In addition to the above-mentioned shortcomings, most known methods are generally limited to thin film formation on a flat plate or outer surface of a tube or fiber. In view of the foregoing, it would be advantageous to provide a thin film coating method that addresses some or all of the limitations mentioned above, but particularly the ability to form thin film coatings in confined spaces, such as on the inside of tubes or other enclosed structures.

These and other aspects and advantages of the invention can be achieved by a self-assembly method for forming a thin film coating. The method includes immersing a tubular workpiece onto which the coating is to be provided lengthwise into a liquid subphase, inserting a first end of a delivery tube into the tubular workpiece so as to bring a distal end surface of the delivery tube to within a predetermined distance from the liquid surface, dispensing a liquid suspension of coating particles into the delivery tube to form a monolayer of the coating particles on the liquid surface in an area of the liquid surface between an inner surface of the tubular workpiece and an outer surface of the delivery tube, and withdrawing the tubular workpiece from the liquid subphase. During the withdrawing, the monolayer coating of coating particles formed on the liquid surface is transferred to the workpiece to form a coating of the coating particles on the inner surface thereof According to embodiments, the coating particles comprise nanoscale or larger particles.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

As used herein, the singular forms "a," "an" and "the" include plural referents unless the context clearly dictates otherwise. Thus, for example, reference to "a suspension" includes examples having two or more such "suspensions" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

The invention relates generally to a method for forming a thin film coating on a surface of a tubular workpiece. More specifically, the invention is related to a method that can be used to form a monolayer of micro- and/or nanoscale particles on an inner surface of a tubular workpiece by initially forming the monolayer at an air-liquid interface and subsequently transferring the monolayer to the inner surface.

The terms thin film, thin film coating and coating are used interchangeably herein. Thin films and coatings are thin material layers that can range in thickness from fractions of a nanometer to several micrometers. In the present context, a monolayer is a single, closely-packed or less than closely-packed layer of coating particles.

Figure 1:
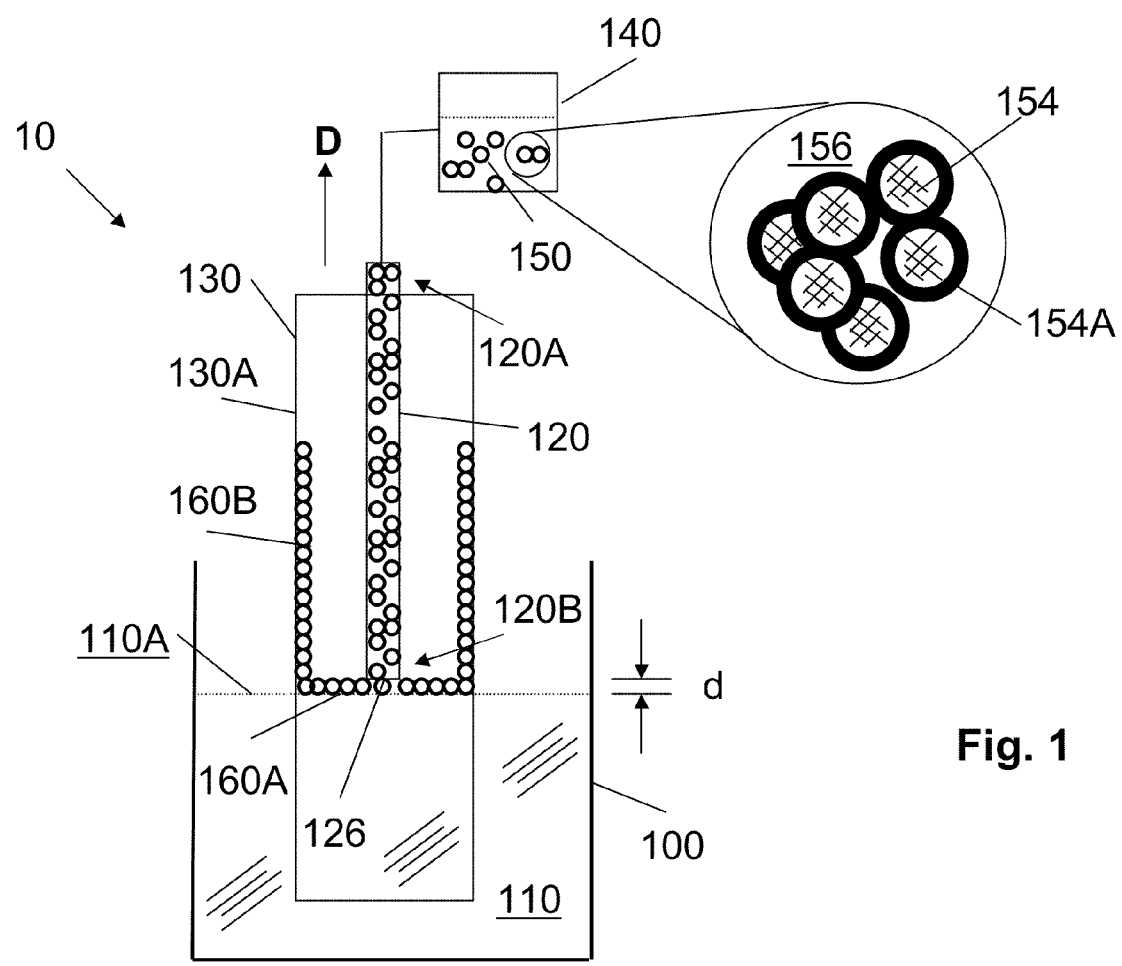
FIG. 1 shows a schematic experimental set-up for practicing a method of forming a thin film coating according to various embodiments.

An experimental set-up 10 that can be used to practice the inventive method is shown schematically in FIG. 1. A container 100 includes a liquid subphase 110 such as an aqueous solution or water. The container depth and volume of liquid subphase are sufficient to at least partially immerse a tubular workpiece 130 therein.

A delivery tube 120 having an outer diameter less than the inner diameter of a tubular workpiece 130 is inserted into the workpiece. As shown in FIG. 1, the delivery tube 120 can be inserted so as to be centered along a central axis of the tubular workpiece 130. Alternatively, the delivery tube can be positioned so as to be offset from a central axis of the workpiece.

The tubular workpiece can have a variety of cross-sectional shapes, including circular, oval, square, rectangular, or other Euclidean shape. The cross-sectional shape of the tubular workpiece can alternatively be an irregular, non-Euclidean shape. The inner diameter of the tubular workpiece can range from about 1 mm to 10 cm. Further, a cross-sectional shape of the delivery tube can be substantially the same as a cross-sectional shape of the tubular workpiece, or it can be different A first end 120A of the delivery tube 120 is connected to a dispensing apparatus for dispensing a suspension of coating particles 140. The dispensing apparatus can include, for example, a syringe, a pump, or a gravity-driven reservoir. The dispensing rate can range from about 1-60 ml/hr.

As used herein, a suspension is a heterogeneous fluid containing solid particles. The solid particles (internal phase) may be dispersed throughout the fluid (external phase) using mechanical agitation. Optionally, the suspension may include excipients or suspending agents. In some respects, the suspension referred to herein may also be characterized as a colloidal dispersion, wherein the suspended particles do not settle over time. Thus, a suspension includes solid particles that may or may not eventually settle over time.

The suspension 150 comprises coating particles 154 and a liquid carrier 156. The coating particles 154 can include, for example, inorganic oxide particles or other organic or inorganic particles and the liquid carrier 156 can include, for example, isopropanol, tetrahydrofuran, acetone, ethanol, butanol and mixtures thereof. In embodiments where the subphase liquid comprises water, the coating particles can be functionalized with a hydrophobic coating.

In such embodiments, the coating particles comprise a hydrophobic coating 154A so that the particles 154 can be dispersed over a surface 110A of an aqueous liquid subphase 110. The coating particles 154 can have a size in the range of about 2 nm-20 μm. A concentration of coating particles in the suspension can be between about 0.01 and 100 mg/ml.

Aspects of forming a hydrophobic coating on the coating particles, as well as a discussion of the various types of coating particles that can be used are disclosed in commonly-owned U.S. Patent Application No. 61/091,015, filed Aug. 22, 2008, the entire contents of which are expressly incorporated by reference herein.

The coating particles can be hydrophilic, hydrophobic or amphiphilic. Exemplary types of particles that can be used include, but are not limited to, glass particles, inorganic non-metallic particles, metallic particles, polymeric particles and particles of semiconducting materials. For example, suitable non-metallic particles include, but are not limited to, inorganic nitride particles, inorganic halide particles and inorganic oxide particles. Suitable inorganic oxide particles include, but are not limited to, silica ($SiO_2$), tin oxide, zinc oxide, indium tin oxide (ITO), tungsten oxide, zirconium oxide or borosilicate particles. Suitable metallic particles can comprise noble metals such as gold, silver, palladium or platinum. The coating particles included in a suspension that is used to form a coating can have the same or different size, shape and/or composition.

Referring still to FIG. 1, a second end 120B of the delivery tube 120 is positioned at or just above a surface 110A of the liquid subphase 110. A distance d between a distal end 126 of the delivery tube and the surface of the liquid subphase can be from about 0 to 1 cm (e.g., 0, 1, 2, 3, 4, 5, 6, 7, 8, 9 or 10 mm). In a non-illustrated embodiment, the distal end of the delivery tube 120 can be partially immersed into the liquid subphase 110 such that d is negative (e.g., −1, −2, −3, −4, −5, −6, −7, −8, −9 or −10 mm).

When the suspension is dispensed through the delivery tube, it disperses on the surface of the liquid subphase, and a film of the coating particles 160A is formed on the liquid surface 110A. The film of coating particles can be a monolayer film.

As the tubular workpiece is withdrawn in the direction of arrow D from the liquid subphase, the dispersed monolayer film 160A is transferred to the inner surface 130A of the tubular workpiece 130 to form a monolayer of coating particles 160B on the inner surface 130A. The rate at which the workpiece is withdrawn from the liquid subphase and the rate at which the suspension is dispensed can be controlled to achieve a balance between the monolayer formation rate on the liquid subphase and the coating formation rate on the workpiece so that the process can be run continuously. For example, the withdrawal rate of the workpiece can range from about 0.01 to 10 mm/s.

The rheology of the suspension and its interaction with both the liquid subphase and the tubular workpiece can be controlled, for example, by controlling the temperature of the liquid subphase, tubular workpiece and/or the temperature of the suspension. For example, the tubular workpiece can be heated in order to control evaporation of the liquid carrier, which can ultimately affect properties of the resulting coating. In embodiments where IPA is used as the liquid carrier, for example, the temperature of the workpiece can be maintained at a temperature in the range of from about 0 to 100° C. Alternatively, or in addition, with such a carrier the temperature of the suspension and/or the liquid subphase can be maintained in the range of about 0 to 100° C.

In an embodiment, the inner and/or outer surfaces of the tubular workpiece can be pretreated prior to coating. The pretreatment can include deposition of a surface-modifying layer such as a surfactant onto the workpiece. The pretreatment can also include the previous formation of a coating.

The inventive process has a number of advantages, including the ability to coat the inner surfaces of tubular bodies with a monolayer of particles at coating rates on the order of mm/s, the ability to coat a workpiece multiple times to achieve a banded and/or multi-layer coating, and the ability to combine the coating of an inner surface with the coating of an outer surface in order to functionalize an entire workpiece. Coated structures prepared using the inventive method can be used in a variety of applications, including optical, catalytic and sensing applications. One example application is to coat the inside of transparent conductive oxide (TCO) coated tubes with photocatalysts such as $TiO_2$ and $WO_3$.

Figure 2:
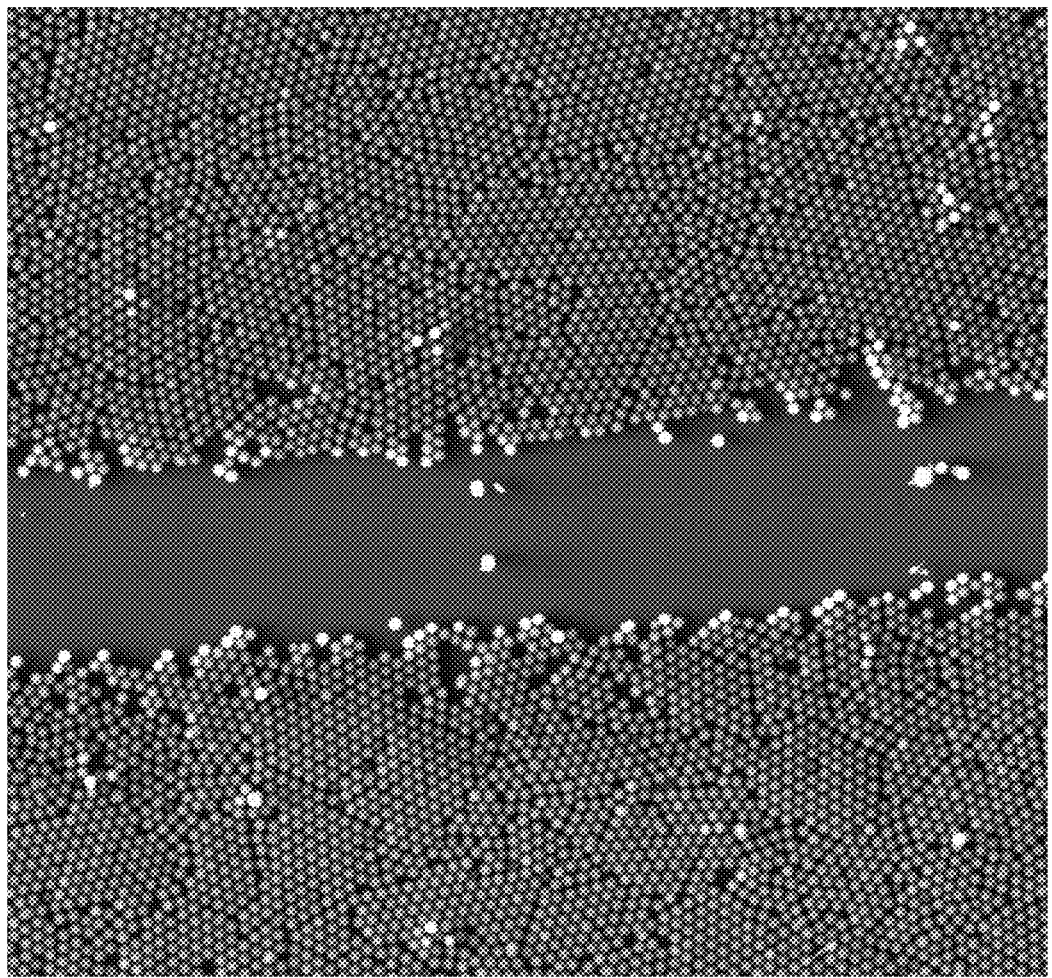
FIG. 2 is a plan view scanning electron micrograph of a portion of a silica monolayer formed on an inner surface of a tubular workpiece according to an embodiment.
Figure 3:
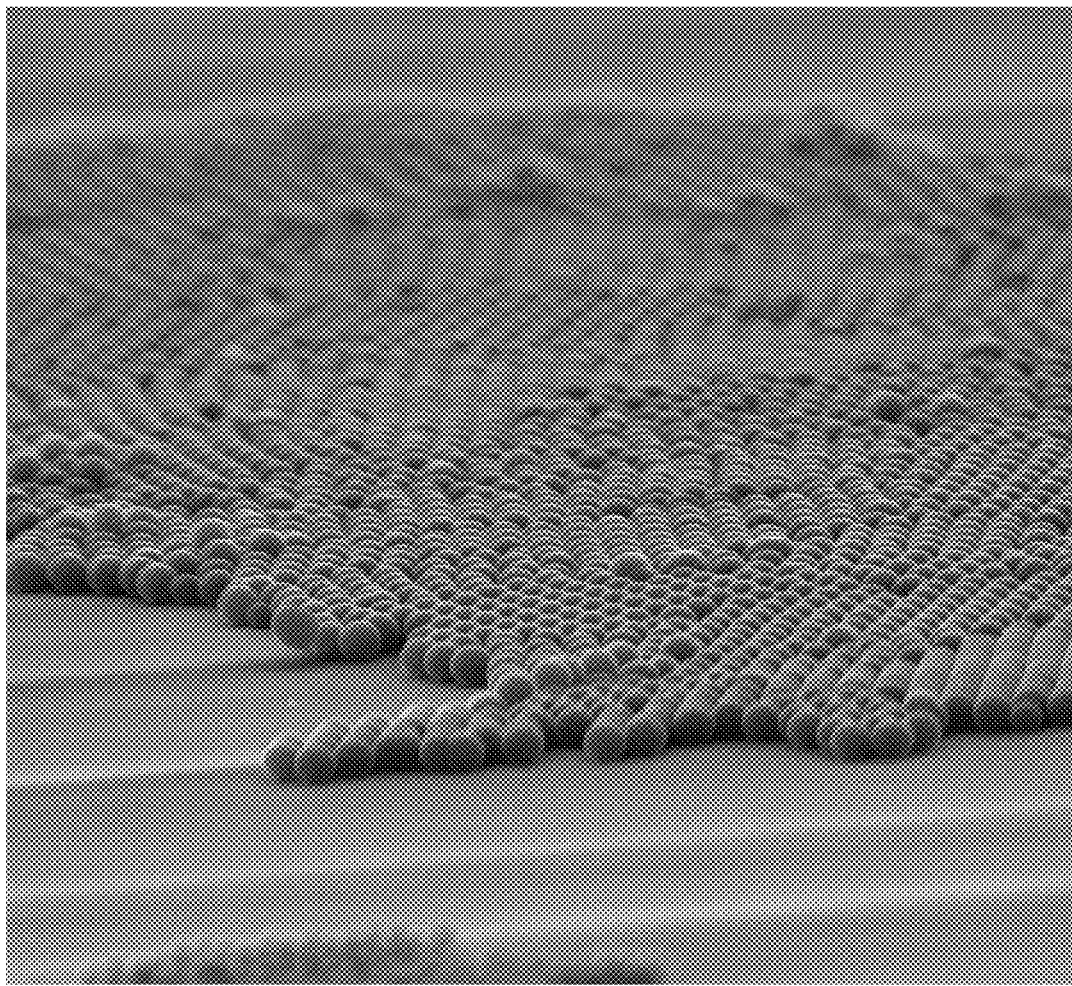
FIG. 3 is a perspective view scanning electron micrograph of a portion of a silica monolayer formed on an inner surface of a tubular workpiece according to an embodiment.

By way of example, a 2 cm inner diameter glass tube was coated with 2.5 μm hydrophobic silica particles. A 10 mg/ml concentration suspension of the silica in IPA was dispensed at a rate of 30 ml/h, and the withdrawal rate of the tube was about 0.3 mm/s. A plan view scanning electron micrograph showing a section of the glass tube comprising an ordered monolayer of silica particles is shown in FIG. 2. The magnification in FIG. 2 is 500×; the bar corresponds to 50 micrometers. A perspective view scanning electron micrograph showing a section of the glass tube comprising an ordered monolayer of silica particles is shown in FIG. 3. The magnification in FIG. 3 is 1500×; the bar corresponds to 10 micrometers. In a further example, the inner surface of a 1 cm inner diameter tube was coated with 21 nm titanium oxide particles using the above process conditions.

According to an embodiment, the acts of immersing, inserting, dispensing and withdrawing can be repeated to form a plurality of coatings. In one approach, repetition of the coating method can be used to build up a coating several monolayers in thickness. Each monolayer can comprise the same or different coating particles. In a further approach, bands of coating material can be formed along separate interior regions of the tubular workpiece by, for example, changing the composition of the suspension during the withdrawal step.

According to yet a further embodiment, the coating method can be modified to form coatings on both the inner and outer surfaces of the tubular workpiece. Coatings on the inner and outer surfaces can be formed simultaneously or successively. For example, a coating on the outer surface of a tubular workpiece can be formed by placing a distal end surface of a second delivery tube proximate to the liquid surface in an area of the liquid surface located outside of the tubular workpiece. A suspension of coating particles and liquid carrier can be added into the second delivery tube to form a monolayer of the coating particles on the liquid surface in an area of the liquid surface outside of the tubular workpiece. During withdrawal of the tubular workpiece from the liquid subphase, a coating of the coating particles can be formed on an outer surface of the workpiece.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of coating an inner surface of a tubular workpiece, said method comprising:
    at least partially immersing a tubular workpiece lengthwise into a liquid subphase having a liquid surface;
    inserting a first end of a first delivery tube into the tubular workpiece such that a distal end surface of the first delivery tube is within a distance d of the liquid surface;
    dispensing a first suspension of coating particles and liquid carrier from the first delivery tube to form a monolayer of the coating particles on the liquid surface in an area of the liquid surface between the inner surface of the tubular workpiece and an outer surface of the first delivery tube; and
    withdrawing at least a portion of the tubular workpiece from the liquid subphase so as to form a coating of the coating particles on a portion of the inner surface of the workpiece.

2. The method according to claim 1, wherein the inner diameter of the tubular workpiece is between about 1 mm and 10 cm.

3. The method according to claim 1, wherein a withdrawal rate of the tubular workpiece is between about 0.01 and 10 mm/sec.

4. The method according to claim 1, further comprising controlling a temperature of the tubular workpiece to a value between about 0 and 100° C.

5. The method according to claim 1, further comprising pre-treating at least one of the inner surface and an outer surface of the tubular workpiece prior to immersing the workpiece.

6. The method according to claim 1, wherein the liquid subphase comprises an aqueous solution.

7. The method according to claim 1, wherein the liquid subphase is water.

8. The method according to claim 1, wherein the first delivery tube is inserted so as to be centered along a central axis of the tubular workpiece.

9. The method according to claim 1, wherein the first delivery tube is inserted so as to be offset from a central axis of the tubular workpiece.

10. The method according to claim 1, wherein the distance d between the distal end surface of the first delivery tube and the liquid surface is less than 1 cm.

11. The method according to claim 1, wherein the distance d between the distal end surface of the first delivery tube and the liquid surface is zero.

12. The method according to claim 1, wherein a cross sectional shape of the first delivery tube is the same as a cross sectional shape of the tubular workpiece.

13. The method according to claim 1, wherein an average size of the coating particles is between about 2 nanometers and 20 micrometers.

14. The method according to claim 1, wherein the coating particles comprise a hydrophobic coating.

15. The method according to claim 1, wherein the coating particles comprise an inorganic oxide.

16. The method according to claim 1, wherein the liquid carrier is selected from the group consisting of isopropanol, tetrahydrofuran, acetone, ethanol, butanol and mixtures thereof.

17. The method according to claim 1, wherein a concentration of coating particles in the suspension is between about 0.01 and 100 mg/ml.

18. The method according to claim 1, further comprising controlling a temperature of the suspension to a value between about 0 and 100° C.

19. The method according to claim 1, further comprising controlling a temperature of the liquid subphase to a value between about 0 and 100° C.

20. The method according to claim 1, wherein a dispensing rate of the suspension is between about 1 and 60 ml/hr.

21. The method according to claim 1, wherein the coating that is formed on a portion of the inner surface of the workpiece is a monolayer coating.

22. The method according to claim 1, wherein the acts of immersing, inserting, dispensing and withdrawing are repeated to form a plurality of coatings.

23. The method according to claim 1, wherein the acts of immersing, inserting, dispensing and withdrawing are repeated to form a coating of coating particles on a previously-formed coating.

24. The method according to claim 1, wherein the acts of immersing, inserting, dispensing and withdrawing are repeated to form a coating of coating particles on an inner surface of the workpiece in an area adjacent to a previously-formed coating.

25. The method according to claim 1, further comprising:
    placing a distal end surface of a second delivery tube proximate to the liquid surface in an area of the liquid surface located outside of the tubular workpiece; and
    dispensing a second suspension of coating particles and liquid carrier into the second delivery tube to form a monolayer of the second coating particles on the liquid surface in an area of the liquid surface outside of the tubular workpiece, wherein
    during withdrawing of the tubular workpiece from the liquid subphase, a coating of the second coating particles is formed on an outer surface of the workpiece.

* * * * *